Sept. 29, 1925.　　　　　　　　　　　　　　　　　　　　1,555,022
J. C. PROCTOR
APPARATUS FOR HANDLING BUILDING MATERIAL
Filed Nov. 17, 1923　　　2 Sheets-Sheet 1

John C. Proctor
INVENTOR

WITNESSES
Louis Goodman
E. N. Lovewell

BY

ATTORNEY

Sept. 29, 1925.
J. C. PROCTOR
1,555,022
APPARATUS FOR HANDLING BUILDING MATERIAL
Filed Nov. 17, 1923    2 Sheets-Sheet 2
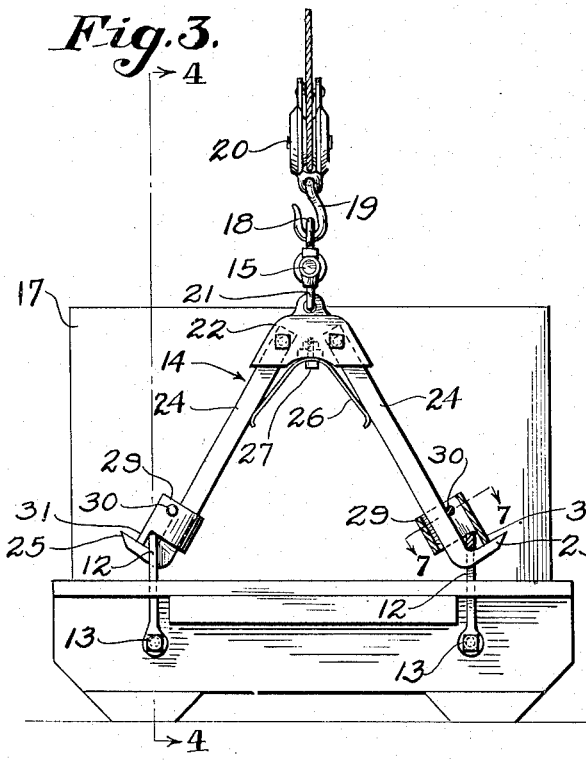
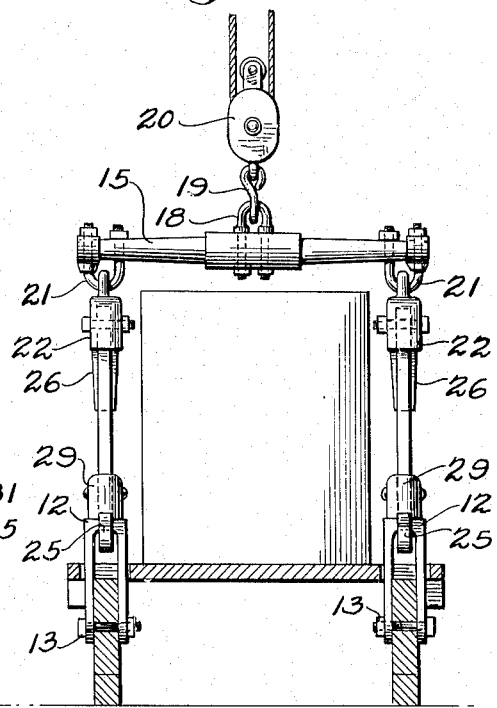
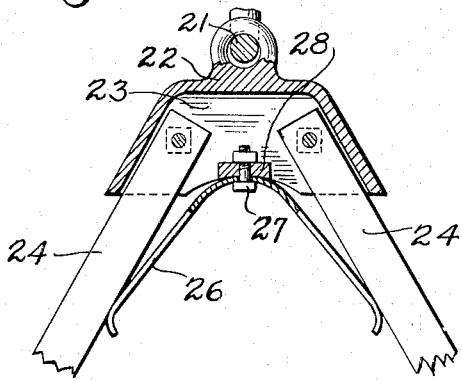
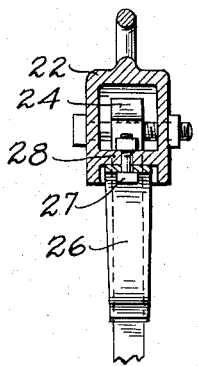
John C. Proctor
INVENTOR Patented Sept. 29, 1925.

1,555,022

UNITED STATES PATENT OFFICE.

JOHN C. PROCTOR, OF SEATTLE, WASHINGTON.

APPARATUS FOR HANDLING BUILDING MATERIAL.

Application filed November 17, 1923. Serial No. 675,335.

*To all whom it may concern:*

Be it known that I, JOHN C. PROCTOR, a citizen of the United States, residing at Seattle, in the county of King and State of Washington, have invented a new and useful Apparatus for Handling Building Material, of which the following is a specification.

This invention relates to an apparatus for handling building materials such as bricks, mortar, hollow tile, building blocks and the like.

The general object of the invention is to provide means by which the material may be expeditiously handled in large units, transferred from the point where it is manufactured or prepared onto cars or trucks, hoisted from the latter into the building under construction and conveyed about the same to the points of utilization, all with a minimum amount of labor and in the shortest possible time.

In handling material in accordance with the method herein proposed, it is possible to handle more material in less time than is customarily required, and with only half as many workmen as has heretofore been necessary.

In the operation of my invention the individual bricks will be handled only twice, once when loaded at the kiln, and again when laid down for the bricklayers. The mortar will be mixed at some convenient place, hauled in metal boxes and delivered to the bricklayers, thus doing away with mixing it on the streets, and leaving the latter comparatively unobstructed. A pallet is provided for each unit handled, and is so constructed that it may be conveniently transported by a truck especially constructed for the purpose, or may be hoisted by a suitable sling carried by a tackle block.

The apparatus, by means of which the desired objects are attained, will be more specifically described in connection with the accompanying drawings, which illustrate the invention in its preferred form.

In the drawings:

Figure 3 is a side elevation of a pallet and sling carrying a mortar box.

Figure 4 is a transverse section on the line 4—4 of Figure 3.

Figure 5 is a detail sectional view of a portion of the sling.

Figure 6 is a detail sectional view taken at right angles to the plane of Figure 5.

Figure 7 is a detail sectional view taken on the line 7—7 of Figure 3.

Figure 1:
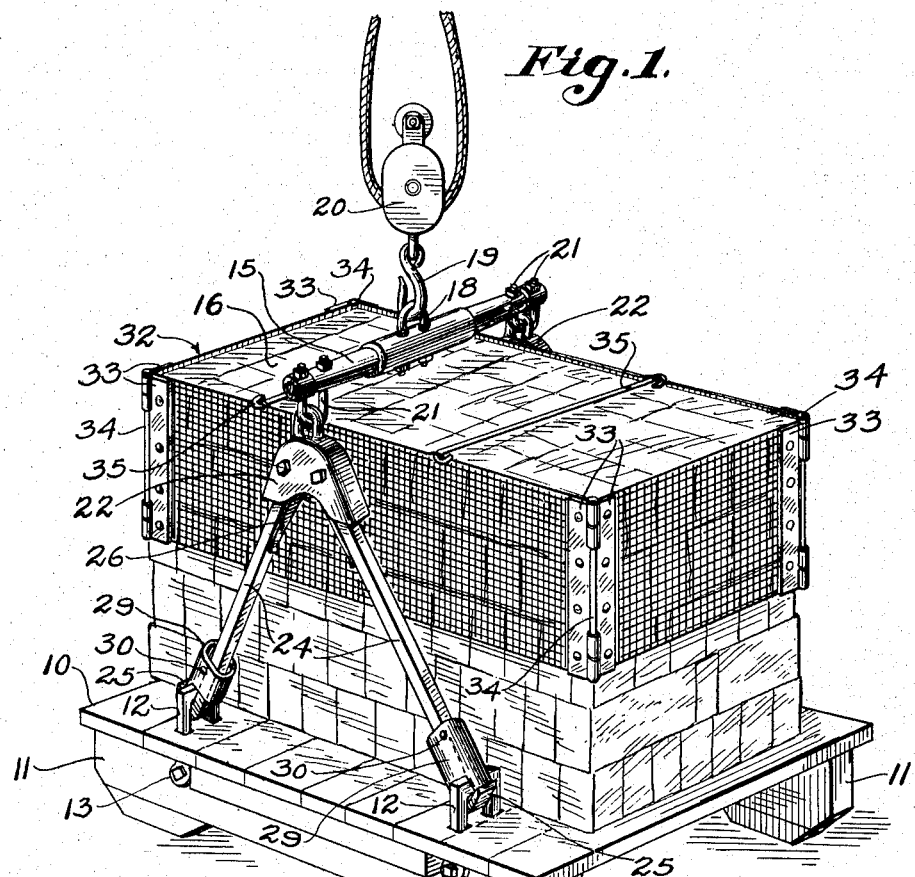
Figure 1 is a perspective view of a unit of bricks ready to be hoisted.
Figure 2:
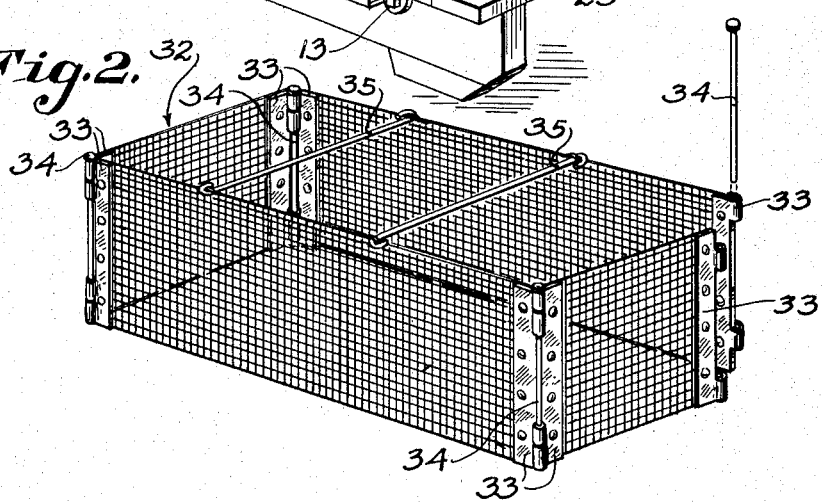
Figure 2 is a perspective view of a hood used to prevent dislodgement of the bricks while in transit.

In carrying out the invention, a pallet 10 is provided for each unit to be handled, and is preferably provided at its sides with runners 11 adapted to overhang the sides of a specially constructed truck, which may be used for conveying the same about the building. The pallet is also provided at each side with a pair of lifting staples 12, which are suitably secured, as at 13, beneath the floor of the pallet and project upwardly to form eyes, which are engageable by a hoisting sling 14 for lifting the material into a truck or car, or from the latter to the building where the material is to be used.

The hoisting sling includes a transverse lifting bar 15, which is long enough to extend transversely across the units to be handled, such as the pile of bricks 16, or the metal mortar box 17. The bar 15 is provided centrally with an eye 18 for engagement by the hook 19 of a tackle block 20. The bar 15 is provided at its ends with eyes 21 adapted to be positioned above the lifting staples 12 of the pallets. Each eye 21 supports a head block 22, which is provided with a recess 23 in its under side for pivotally receiving the upper ends of a pair of lifting arms 24, the lower ends of which are provided with hooks 25 engageable with the staples 12. Each pair of lifting arms 24 is normally spread by a leaf spring 26 centrally secured by a bolt 27, or the like, to a web 28 extending transversely across the recess 23. Each arm 24 is surrounded by a flattened slidable sleeve 29, which is provided with a transverse pin 30 adapted to ride along the outer edge of the arm 24, and also has a downwardly projecting finger 31. The sleeve 29 is adapted to slide downwardly on the lifting arm 24 by gravity, so that the finger 31 engages the hook 25, enclosing the staple and locking the hook thereto. When the load has been transferred to the desired position, however, the hooks may be easily released from the staples by raising the sleeves 29, and pressing the arms 24 inwardly against the action of the spring 26.

When the device is used for handling a load of bricks, as shown at 16, it is preferred to enclose the upper portion of the load by a hood 32, in order to retain the bricks against accidental dislodgement. This hood, as herein shown, is in the form of a wire screen of heavy gage and rectangular in shape to correspond to the load of bricks with which it is to be used. The sides and ends of the hood 32 are preferably made separable, and in the form herein shown are provided with corner plates 33, which are held in assembled relation by means of a hinge pin 34. A number of rods 35 extend transversely across the top of the hood and rest upon the bricks.

In using my invention for the handling of bricks, the latter are piled upon the pallet 10 when removed from the kiln, and each pallet with its load is transferred by means of a truck, or hoisted by means of the apparatus herein described, and each unit load of bricks remains upon the pallet until it is delivered into convenient position for the bricklayer. The handling of the individual bricks in loading them onto the car or auto truck is therefore dispensed with, and each pallet load is handled as a unit. In other words, the load of material carried by each pallet 10 remains thereon, from the time it leaves its original source, while it is transferred to and from box cars, platforms, or onto trucks and thence to the place where it is used, thus saving time and expense which would be necessary, if the individual bricks were to be handled and re-handled. The metal mortar box 17 may be handled in like manner, thus making it convenient to mix the mortar at some convenient place out of the way, and thus leaving the street unobstructed. Much labor and expense is therefore eliminated, and street obstructions are avoided.

While I have shown and described the specific construction of one form in which the invention may be embodied, it is to be understood that this is merely illustrative, and that various modifications may be made therein without departing from the salient features of the invention as set forth in the appended claims.

What is claimed is:

1. In a material handling apparatus, the combination of a pallet, each side of which is provided with a pair of upstanding eyes, a hoisting sling having opposed pairs of depending lifting arms with outwardly turned hooks at their lower ends, each lifting arm having a slidable sleeve mounted thereon with a downwardly projecting finger, said sleeve being normally held by gravity with the finger cooperating with the hood to lock the same to the respective eye.

2. In a material handling apparatus, the combination of a pallet, each side of which is provided with upstanding eyes, a hoisting sling having depending lifting arms formed with hooks at their lower ends engageable with said eyes, each lifting arm having a slidable sleeve mounted thereon with a downwardly projecting finger adapted to cooperate with the hook to lock the same to the respective eye.

3. In a material handling apparatus, the combination of a pallet having a floor and side runners on which the floor is supported, each side of the pallet being provided with upstanding eyes, a hoisting sling having depending lifting arms formed with hooks at their lower ends engageable with said eyes, resilient means urging the hooks into engagement with the eyes, and a slidable sleeve mounted on each lifting arm and having a downwardly projecting finger adapted to cooperate with the hook to lock the same to the respective eye.

4. In a material handling apparatus, the combination of a pallet having a floor and side runners on which the floor is supported, each side of the pallet being provided with upstanding eyes, a hoisting sling having opposed pairs of depending pivoted lifting arms with outwardly turned hooks at their lower ends, resilient means normally urging said arms outwardly about their pivots to cause the hooks to engage the respective eyes, each lifting arm having a slidable sleeve mounted thereon, and provided with a downwardly projecting finger, said sleeve being normally held by gravity with the finger engaging the hook to lock the same in the eye.

5. A hoisting sling comprising a bar, a head block supported at each end of the bar, a pair of lifting arms pivotally carried by each head block, and having outturned hooks at their lower ends, and means yieldably urging said hooks outwardly from each other.

6. A hoisting sling comprising a lifting bar provided centrally with means for engagement by a tackle hook, a depending eye at each end of the bar, a head block carried by each of said depending eyes, a pair of lifting arms pivotally carried by each head block and having outturned hooks at their lower ends, means yieldably urging said hooks outwardly from each other, and a pallet having upstanding eyes with which said hooks are engageable.

7. A hoisting sling comprising a bar, a head block supported at each end of the bar, said block having a recess in its underside with opposed downwardly and outwardly sloping walls, lifting arms pivoted at their upper ends within the recess and having outwardly turned hooks at their lower ends, and a spring acting between the arms to urge them outwardly against said sloping walls.

8. A hoisting sling comprising a bar, a head block supported at each end of the bar, each of said blocks having a recess in its underside with opposed downwardly and outwardly sloping walls, a pair of lifting arms pivoted at their upper ends within the recess and having outwardly turned hooks at their lower ends, a web extending transversely across said recess, and a leaf spring secured centrally to said web with its ends bearing against said arms to urge the hooks outwardly.

9. The combination of a hoisting sling, comprising a bar, a head block supported at each end of the bar, a pair of lifting arms carried by each head block and having outturned hooks at their lower ends, means yieldably urging said hooks outwardly from each other, a pallet having upstanding eyes with which said hooks are engageable, and a slidable sleeve on each arm provided with a downwardly projecting finger, said sleeve being normally held by gravity with the finger engaging the hook to lock the same in its respective eye.

10. In a material handling apparatus, the combination of a hoisting sling, comprising a lifting bar provided centrally with an eye for engagement by a tackle hook, a depending eye at each end of the bar, a head block carried by each of said depending eyes, each of said blocks having a recess in its underside with opposed downwardly and outwardly sloping walls, a pair of lifting arms pivoted at their upper ends within the recess and having outwardly turned hooks at their lower ends, a web extending transversely across said recess, a leaf spring secured centrally to said web with its ends bearing against said arms to urge the hooks outwardly, a pallet having upstanding eyes with which said hooks are engageable, and a slidable sleeve on each arm normally held by gravity at the lower end thereof, and having a finger cooperating with the hook to lock the same in engagement with the respective eye of the pallet.

In testimony, that I claim the foregoing as my own, I have hereto affixed my signature.

JOHN C. PROCTOR.